US012018764B2

United States Patent
Zhang et al.

(10) Patent No.: US 12,018,764 B2
(45) Date of Patent: Jun. 25, 2024

(54) VALVE, BATTERY AND POWER CONSUMPTION DEVICE

(71) Applicant: CONTEMPORARY AMPEREX TECHNOLOGY CO., LIMITED, Ningde (CN)

(72) Inventors: Fan Zhang, Ningde (CN); Lei Chen, Ningde (CN); Heyuan Li, Ningde (CN); Langchao Hu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 160 days.

(21) Appl. No.: 17/540,296

(22) Filed: Dec. 2, 2021

(65) Prior Publication Data

US 2022/0090692 A1   Mar. 24, 2022

Related U.S. Application Data

(63) Continuation of application No. PCT/CN2021/092823, filed on May 10, 2021.

(30) Foreign Application Priority Data

Aug. 31, 2020  (CN) .......................... 202010901519.2

(51) Int. Cl.
*F16K 17/196* (2006.01)
*F16K 15/04* (2006.01)
(Continued)

(52) U.S. Cl.
CPC .......... *F16K 17/196* (2013.01); *F16K 15/063* (2013.01); *F16K 17/0413* (2013.01);
(Continued)

(58) Field of Classification Search
CPC ... Y10T 137/7771–7778; F16K 17/196; F16K 17/164; F16K 17/0413;
(Continued)

(56) References Cited

U.S. PATENT DOCUMENTS 2,148,839 A * 2/1939 Rossman ................ F16F 9/443
                                                        137/493
2,691,387 A * 10/1954 Strauss ...................... F16F 9/34
                                                        251/120
(Continued)

FOREIGN PATENT DOCUMENTS

CN     102661411 A    9/2012
CN     202501056 U   10/2012
(Continued)

OTHER PUBLICATIONS

Translation of DE 202019105950. Aug. 11, 2020-08-11.*
(Continued)

*Primary Examiner* — William M McCalister
(74) *Attorney, Agent, or Firm* — Scully, Scott, Murphy & Presser, P.C.

(57) ABSTRACT

A valve, a battery and a power consumption device are disclosed, the valve includes a valve body, a barrier, a first unidirectional valve core and a second unidirectional valve core. The valve body includes a fluid channel; the barrier is disposed in the fluid channel, and separates the fluid channel into a first cavity and a second cavity, the barrier is provided with a first through hole and a second through hole communicating the first cavity and the second cavity; the first unidirectional valve core is configured to close or open the first through hole; the second unidirectional valve core is configured to close or open the second through hole, opening directions of the first unidirectional valve core and the second unidirectional valve core are opposite. The valve is
(Continued)

compact and capable of implementing a bi-directional flow of fluid.

16 Claims, 10 Drawing Sheets

(51) Int. Cl.
| | |
|---|---|
| *F16K 15/06* | (2006.01) |
| *F16K 17/04* | (2006.01) |
| *H01M 50/308* | (2021.01) |
| *H01M 50/325* | (2021.01) |
| *H01M 50/333* | (2021.01) |

(52) U.S. Cl.
CPC ....... *H01M 50/325* (2021.01); *H01M 50/333* (2021.01); *F16K 15/044* (2013.01); *F16K 17/0406* (2013.01); *H01M 50/308* (2021.01)

(58) Field of Classification Search
CPC . F16K 15/063; H01M 50/325; H01M 50/333; H01M 50/308
USPC ..................... 137/493–493.7, 493.9
See application file for complete search history.

(56) References Cited

U.S. PATENT DOCUMENTS

| | | | | |
|---|---|---|---|---|
| 2,707,378 | A * | 5/1955 | Ryan .................. | F16K 17/30 251/63.4 |
| 2,800,981 | A * | 7/1957 | Allinquant .............. | F16F 9/516 137/493 |
| 2,807,279 | A * | 9/1957 | Presnell ................. | F16K 17/19 137/513.5 |
| 3,108,610 | A * | 10/1963 | De See ................. | F16K 17/196 137/550 |
| 3,304,952 | A * | 2/1967 | Krone .................. | B60P 3/2255 137/854 |
| 3,435,844 | A * | 4/1969 | Stelzer ................. | F16K 17/26 137/543.13 |
| 3,597,009 | A * | 8/1971 | Baldwin ............... | B60T 11/34 303/9.62 |
| 3,613,718 | A * | 10/1971 | Ballinger ............. | F16K 17/196 137/493 |
| 3,706,362 | A * | 12/1972 | Faure ................... | F16F 9/512 188/320 |
| 4,016,904 | A * | 4/1977 | Gordon ................ | F16K 17/196 137/315.04 |
| 4,109,767 | A * | 8/1978 | Nandyal ............... | F16F 9/34 188/315 |
| 4,342,329 | A * | 8/1982 | Roff .................... | F16K 17/196 137/493.9 |
| 4,561,559 | A | 12/1985 | Rutan et al. | |
| 4,596,321 | A * | 6/1986 | Harper ................. | F16F 9/512 137/493 |
| 4,962,548 | A | 10/1990 | Deventer et al. | |
| 5,282,492 | A * | 2/1994 | Angeli ................ | F16K 17/196 137/493.4 |
| 5,950,670 | A | 9/1999 | Flaim | |
| 6,003,427 | A * | 12/1999 | Asbrand .............. | B62D 5/062 137/493.9 |
| 7,171,977 | B2 * | 2/2007 | Wass ................... | F16K 15/207 137/493.9 |
| 10,280,874 | B2 * | 5/2019 | Tsuzuki ............. | F02M 25/0836 |
| 11,428,335 | B2 * | 8/2022 | Caya .................. | F16K 17/0486 |

FOREIGN PATENT DOCUMENTS

| | | |
|---|---|---|
| CN | 203940063 U | 11/2014 |
| CN | 104285506 A | 1/2015 |
| CN | 104455616 A | 3/2015 |
| CN | 205388172 U | 7/2016 |
| CN | 207634758 U | 7/2018 |
| DE | 102004046844 A1 | 10/2005 |
| DE | 202019105950 U1 | 8/2020 |
| JP | S5284732 U | 6/1977 |
| JP | S54164167 U | 11/1979 |
| JP | S55140166 U | 10/1980 |
| KR | 10-2013-0016649 A | 2/2013 |
| WO | 2005/098291 A1 | 10/2005 |

OTHER PUBLICATIONS

Extended European Search Report dated Aug. 31, 2022 received in European Patent Application No. 21819018.9.
First Office Action dated Jun. 26, 2022 received in Chinese Patent Application No. CN 202010901519.2.
Notice of Reasons for Refusal dated Jul. 10, 2023 received in Japanese Patent Application No. JP 2022-530959.

* cited by examiner

VALVE, BATTERY AND POWER CONSUMPTION DEVICE

CROSS-REFERENCE OF RELATED APPLICATIONS

This application is a continuation of International Application No. PCT/CN2021/092823, filed on May 10, 2021, which claims priority to Chinese Patent Application No. 202010901519.2, filed on Aug. 31, 2020. The disclosures of the aforementioned applications are hereby incorporated by reference in their entireties.

FIELD OF TECHNOLOGY

The present application relates to the technical field of valves, in particular to a valve, a battery and a power consumption device.

BACKGROUND

Due to the advantages of high energy density, high power density, high number of cycles and long storage time, batteries have been commonly used in electric vehicles. At present, the safety of the battery restricts the development of the battery, so the research on the technology related to the safety of the battery has become one of the research topics. It was found that the pressure inside the battery box is too large or too small during the use of the battery, which will affect the use safety of the battery.

SUMMARY

An object of the present application is to provide a valve capable of realizing a bi-directional flow of fluid.

Another object of the present application is to provide a battery capable of achieving internal and external pressure balance.

A further object of the present application is to provide a power consumption device whose battery has a longer service life.

The present application is realized by the following technical solution:

in one aspect, an embodiment of the present application provides a valve, which includes:

a valve body including a fluid channel, the fluid channel including a first end and a second end;

a barrier disposed in the fluid channel and separating the fluid channel into a first cavity and a second cavity, where the first cavity is in fluid communication with the first end, the second cavity is in fluid communication with the second end, and the barrier is provided with a first through hole and a second through hole communicating the first cavity and the second cavity;

a first unidirectional valve core configured to close or open the first through hole; and a second unidirectional valve core configured to close or open the second through hole, opening directions of the first unidirectional valve core and the second unidirectional valve core being opposite such that a difference between a fluid pressure at the first end and a fluid pressure at the second end is within a preset range.

According to the valve provided by the embodiment of the present application, the barrier includes two through holes, and the two through holes share one fluid channel, to save space; the first unidirectional valve core and the second unidirectional valve core are jointly integrated in the valve body, and a structure of the whole valve is compact; when a difference of fluid pressure at both ends of the fluid channel is within a preset range, the fluid channel is blocked by the first unidirectional valve core and the second unidirectional valve core to prevent the fluid from continuously flowing in the fluid channel; when the first unidirectional valve core reaches an opening condition, the first unidirectional valve core can open the first through hole, so that the fluid flows unidirectionally in the fluid channel through the first unidirectional valve core; and when the second unidirectional valve core reaches the opening condition, the second unidirectional valve core can open the second through hole, so that the fluid flows unidirectionally in the fluid channel through the second unidirectional valve core. When the valve is applied to a closed cavity, the valve can balance the air pressure inside and outside the closed cavity.

In an embodiment of the present application, the first unidirectional valve core is disposed in the second cavity, and the second unidirectional valve core is disposed in the first cavity.

In the above embodiment, the first unidirectional valve core and the second unidirectional valve core are located in two different cavities to facilitate opening the first unidirectional valve core or the second unidirectional valve core according to the pressure of the fluid.

In an embodiment of the present application, the valve also includes an elastic return member shared by the first unidirectional valve core and the second unidirectional valve core, and the elastic return member tends to hold the first unidirectional valve core at a position closing the first through hole and hold the second unidirectional valve core at a position closing the second through hole.

In the above embodiment, the first unidirectional valve core and the second unidirectional valve core share one elastic return member, which is compact in structure, saves costs, and is easy to install.

In an embodiment of the present application, the valve further includes a support base disposed in the first cavity and linked with the first unidirectional valve core; and the elastic return member is disposed in the first cavity, one end of the elastic return member abuts against the second unidirectional valve core, and the other end of the elastic return member abuts against the support base.

In the above embodiment, the support base is disposed to facilitate the installation and positioning of the elastic return member, and the first unidirectional valve core and the second unidirectional valve core share the elastic return member through the support base.

In an embodiment of the present application, the support base is in sliding fit with an inner wall of the fluid channel.

In the above embodiment, an edge of the support base is limited by the inner wall of the fluid channel to ensure a stable movement of the support base.

In an embodiment of the present application, the valve further includes a connection member, one end of the connection member is connected with the support base, the other end of the connection member is connected with the first unidirectional valve core, and the support base is linked with the first unidirectional valve core through the connection member.

In the above embodiment, by disposing the connection member, it is possible to realize a linkage cooperation between the support base and the first unidirectional valve core.

In an embodiment of the present application, the connection member passes through the barrier.

In the above-mentioned embodiment, the connection member disposed in such a way reasonably utilizes the installation space and ensures a stable linkage between the support base and the first unidirectional valve core.

In one embodiment of the present application, the connection member passes through the first through hole, a cross-sectional area of the first through hole is greater than that of the connection member.

In the above embodiment, the connection member is located in the first through hole, so that the barrier does not need to separately provide a hole for the connection member to penetrate, and the processing difficulty is reduced.

In an embodiment of the present application, the first through hole is disposed in a center of the barrier.

In the above embodiment, a position of the first through hole is convenient for collection of fluids, so that stress of the first unidirectional valve core is concentrated and an opening difficulty of the first unidirectional valve core is reduced.

In an embodiment of the present application, the number of second through holes is multiple, and a plurality of second through holes are disposed at intervals around the center of the barrier.

In the above embodiment, a plurality of second through holes are provided to ensure a force balance of the second unidirectional valve core, so as to open the second through holes stably.

In an embodiment of the present application, the first unidirectional valve core is provided with an avoidance portion, the avoidance portion communicates with the second through hole, and the first unidirectional valve core is in sliding fit with an inner wall of the fluid channel.

In the above embodiment, the avoidance portion is disposed to allow the fluid to flow into the second through hole easily through the avoidance portion; and the edge of the first unidirectional valve core is limited by the inner wall of the fluid channel so that the first unidirectional valve core moves stably relative to the fluid channel.

In an embodiment of the present application, the second unidirectional valve core is in sliding fit with the inner wall of the fluid channel.

In the above embodiment, an edge of the second unidirectional valve core is limited by the inner wall of the fluid channel so that the second unidirectional valve core moves stably relative to the fluid channel.

In an embodiment of the present application, the valve further includes a first sealing gasket mounted to the first unidirectional valve core and configured to seal a joint of the first unidirectional valve core and the barrier when the first unidirectional valve core is closed.

In the above embodiment, the first sealing gasket is disposed so that the sealing effect between the first unidirectional valve core and the barrier is good.

In an embodiment of the present application, the first unidirectional valve core includes a first surface facing the barrier, the first surface is provided with a first groove, the first sealing gasket is embedded in the first groove, and the first sealing gasket protrudes from the first surface when the first unidirectional valve core is opened.

In the embodiment, the first sealing gasket disposed in such way ensures the good sealing performance of the first unidirectional valve core and the barrier, so that the sealing reliability of the first unidirectional valve core and the barrier is high; and the friction between the first sealing gasket and the barrier is eliminated, and the long-term reciprocating sealing reliability is increased.

In an embodiment of the present application, the valve further includes a second sealing gasket mounted to the second unidirectional valve core and configured to seal a joint of the second unidirectional valve core and the barrier when the second unidirectional valve core is closed.

In the above embodiment, the second sealing gasket is disposed so that the sealing effect between the second unidirectional valve core and the barrier is good.

In an embodiment of the present application, the second unidirectional valve core includes a second surface facing the barrier, the second surface is provided with a second groove, the second sealing gasket is embedded in the second groove, and the second sealing gasket protrudes from the second surface when the second unidirectional valve core is opened.

In the embodiment, the second sealing gasket disposed in such way ensures the good sealing performance of the second unidirectional valve core and the barrier, so that the sealing reliability of the second unidirectional valve core and the barrier is high; and the friction between the second sealing gasket and the barrier is eliminated, and the long-term reciprocating sealing reliability is increased.

In an embodiment of the present application, the barrier is integrally formed or fixedly connected with the valve body.

In the above embodiment, the connection mode between the barrier and the valve body ensures that the barrier and the valve body are firmly connected.

In an embodiment of the present application, the valve further includes a breathable film disposed at the first end and/or the second end.

In the above embodiment, the breathable film is disposed to enable the valve to be applied to the use environment requiring breathable and waterproof, such as the battery, to prevent moisture and impurities from entering the inside of the battery, and to improve the reliability of the battery.

On the other hand, the embodiment of the present application also provides a battery, which includes a box, a battery cell disposed in the box and the valve disposed on the box.

In another aspect, the embodiment of the present application also provides a power consumption device, which includes the battery as described above.

Additional aspects and advantages of the present application will be set forth in part in the following description which will become apparent from the following description or will become apparent from the practice of the present application.

BRIEF DESCRIPTION OF THE DRAWINGS

In order to more clearly explain the technical solution of the embodiments of the present application, the drawings required for use in the embodiments of the present application will be briefly described below, and it will be apparent that the drawings described below are only some embodiments of the present application, and other drawings may be obtained from the drawings without exerting creative effort by those of ordinary skill in the art.

Figure 1:
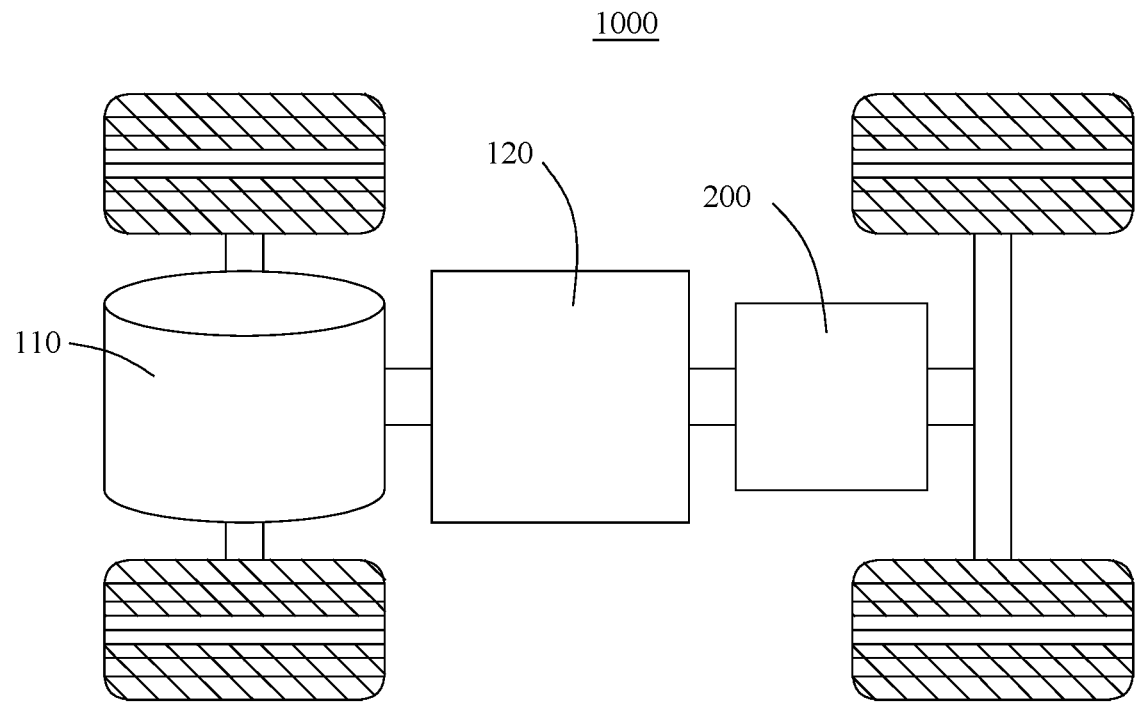
FIG. 1 is a structural schematic diagram of a vehicle provided by an embodiment of the present application.

Reference signs: 1000—vehicle; 110—motor; 120—controller; 200—battery; 210—box; 300—valve; 310—valve body; 311—fluid channel; 3111—first end; 3112—second end; 312—first cavity; 313—second cavity; 314—chute; 320—barrier; 321—first through hole; 322—a second through hole; 330, 330a, 330b, 330c, 330d—first unidirectional valve core; 331—first ramp; 332—avoidance portion; 333—first surface; 334—first groove; 335—bump; 340, 340a, 340b, 340c, 340d—second unidirectional valve core; 341—second ramp; 342—second surface; 343—second groove; 350a, 350b—first elastic member; 360a, 360b—second elastic member; 370a, 370b—first restraint element; 380a, 380b—second restraint element; 390—breathable film; 410, 410a, 410b—elastic return member; 420—rotating shaft; 430—support base; 440—connection member; 441—step; 450—first sealing gasket; 460—second sealing gasket; 470, 470a, 470b—vent hole; 480—locking element; 490—mounting base; 491—annular mounting slot; 492—sealing ring; 493—ventilation channel; 510—end cap; 511—avoidance hole; 520—protective cover; D—difference between fluid pressure at first end and fluid pressure at second end; I—inside; O—outside.

DETAILED DESCRIPTION OF THE EMBODIMENTS

In order to make the object, technical solution and advantages of the embodiments of the present application clearer, the technical solution of the embodiments of the present application will be clearly and completely described in conjunction with the accompanying drawings in the embodiments of the present application, and it will be obvious that the described embodiments are part of the embodiments of the present application, but not all of them. Components of embodiments of the present application generally described and illustrated in the drawings herein may be arranged and designed in a variety of different configurations.

Accordingly, the following detailed description of the embodiments of the present application provided in the accompanying drawings is not intended to limit the scope of the claimed application but is merely representative of selected embodiments of the present application. Based on the embodiments in the present application, all other embodiments obtained by those of ordinary skill in the art without exerting creative efforts fall within the scope of protection of the present application.

It should be noted that like numerals and letters denote like items in the following drawings, and therefore, once an item is provided in one drawing, it does not need to be further provided and explained in subsequent drawings.

In the description of the present application, it should be noted that, the terms "inside", "outside" and the like denote an orientation or positional relationship that is based on the orientation or positional relationship shown in the drawings, or the orientation or positional relationship customarily placed when the product of the present application is used, is only for the convenience of describing the present application and simplifying the description, and does not indicate or imply that the device or element in question must have a specific orientation, be constructed and operated in a specific orientation, so it cannot be understood as limiting to the present application. Furthermore, the terms "first", "second", etc. are used only to distinguish descriptions and cannot be understood to indicate or imply relative importance.

In the description of the present application, it should also be noted that unless otherwise expressly specified and limited, the terms "set" and "connected" should be understood in a broad sense, for example, it can be a fixed connection or a detachable connection, or being integrally connected; it can be being directly connected or indirectly connected through an intermediate medium, and it can be an internal communication between two components. The specific meanings of the above terms in the present application may be understood in particular to those of ordinary skill in the art.

After analyzing the problem that the pressure inside the battery box will change, the inventor found that for some sealed boxes (for example, the battery box, the transmission box, etc.), it is necessary to ensure that external liquid and dust cannot enter the box so as not to affect the normal operation of devices in the box. However, under the condition of complete sealing, when the device works, the temperature and pressure in the box rise, and the gas in the box cannot be discharged; and when the device stops or the weather cools down at night, the pressure in the box decreases to generate negative pressure, and the external gas cannot enter. This repeated will cause the box seal failure, resulting in the box waterproof and dustproof grade reduction. For the battery box, when the air pressure inside the battery box is too large, it is easy to cause the seal failure or even explosion of the box; when the external pressure is greater than the internal pressure of the box, the internal devices of the box squeeze each other, which may lead to the seal failure or insulation failure, short circuit and other problems, thus affecting the safety of battery use. Accordingly, the present application provides a valve, a battery, and a power consumption device to solve or partially solve the problem that some of sealed boxes in the prior art need to be ventilated and other potential problems.

FIG. 1 is a simple schematic diagram of a vehicle 1000 according to an embodiment of the present application. The vehicle 1000 can be a fuel vehicle, a gas vehicle or a new energy vehicle, and the new energy vehicle can be a pure electric vehicle, a hybrid vehicle or an extended-range vehicle. As shown in FIG. 1, a battery 200 may be provided inside the vehicle 1000, for example, the battery 200 may be provided at the bottom of the vehicle 1000 or at the front or rear of the vehicle 1000. The battery 200 may be used for power supply of the vehicle 1000, for example, the battery 200 may be used as an operating power supply of the vehicle 1000. And the vehicle 1000 may also include a controller 120 and a motor 110. The controller 120 is used to control the battery 200 to supply power to the motor 110, for example, for starting navigation and operating power requirements during driving of the vehicle 1000. In another embodiment of the present application, the battery 200 may be used not only as an operating power source for the vehicle 1000, but also as a driving power source for the vehicle 1000, to provide driving power for the vehicle 1000 instead or in part instead of fuel or natural gas.

The battery 200 referred to in the embodiments of the present application refers to a single physical module that includes one or more battery cells to provide higher voltage and capacity. For example, the battery 200 referred to in the present application may include a battery module or a battery pack or the like. The battery cell includes a positive electrode plate, a negative electrode plate, electrolyte and an insulating film, which is the basic structural unit of battery module and battery pack. The battery cells are generally divided into three types according to the packaging method: cylindrical battery cells, prismatic battery cells and pouch battery cells.

A plurality of battery cells may be connected in series and/or in parallel via electrode terminals for use in a variety of applications. In some high-power applications such as electric vehicles, the application of the battery 200 includes three levels: battery cell, battery module and battery pack. The battery module is formed by electrically connecting a certain number of battery cells together and placing them in a frame in order to protect the battery cells from external shock, heat, vibration, etc. The battery pack is the final state of the battery system installed in the electric vehicle. At present, most battery packs are made by assembling various control and protection systems such as battery management system and thermal management components on one or more battery modules. With the development of technology, the level of battery module can be omitted, that is, battery packs can be directly formed from battery cells. With this improvement, the weight energy density and volume energy density of the battery system are improved, while the number of components is significantly reduced.

Figure 2:
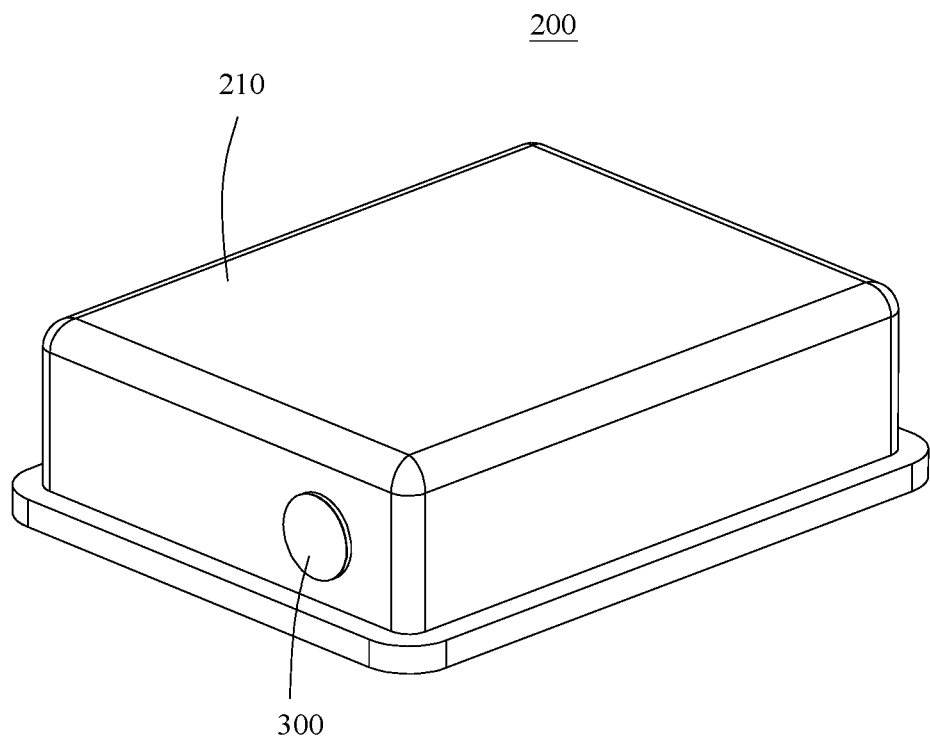
FIG. 2 is a structural schematic diagram of a battery provided by an embodiment of the present application.

The inventor of the present application provides a battery 200, as shown in FIG. 2, the battery 200 includes a box 210, a battery cell (not shown) and a valve 300, the battery cell is disposed in the box 210 and the valve 300 is disposed on the box 210. When the air pressure inside and/or outside of the box 210 changes, the valve 300 can be opened to balance the air pressure inside and outside of the box 210, thereby balancing the air pressure inside and outside of the box 210 and realizing the ventilation of the box 210. It can be understood that the battery 200 described in the embodiment of the present application is applicable for various devices using the battery 200, for example, mobile phones, portable devices, notebook computers, battery cars, electric cars, ships, spacecraft, electric power toys and electric power tools, etc. For example, spacecraft includes airplanes, rockets, space shuttles, spaceships and so on. Electric power toys include stationary or mobile power toys, for example, game machines, electric car toys, electric ship toys and electric plane toys, etc. Electric power tools include metal cutting power tools, grinding power tools, assembly power tools and railway power tools, such as electric drills, electric grinders, electric wrenches, electric screwdrivers, electric hammers, impact drills, concrete vibrators and electric planers.

The battery 200 described in the embodiment of the present application is not only applicable to the power consumption device described above but may also be applicable to all devices using the battery 200.

The embodiment of the present application provides a valve, the valve can be disposed on the box of a battery, and is used for realizing the bi-directional flow of gas in a fluid channel, so as to balance the air pressure inside and outside the box.

Hereinafter, for convenience of description, according to the present application scenario of the valve, a side of the valve close to the inside of the box of the battery is provided as "inside", and a side of the valve away from the inside of the box (the side communicating with the outside) is provided as "outside". In the drawings, the letter I denotes "inside" and the letter O denotes "outside".

Figure 3:
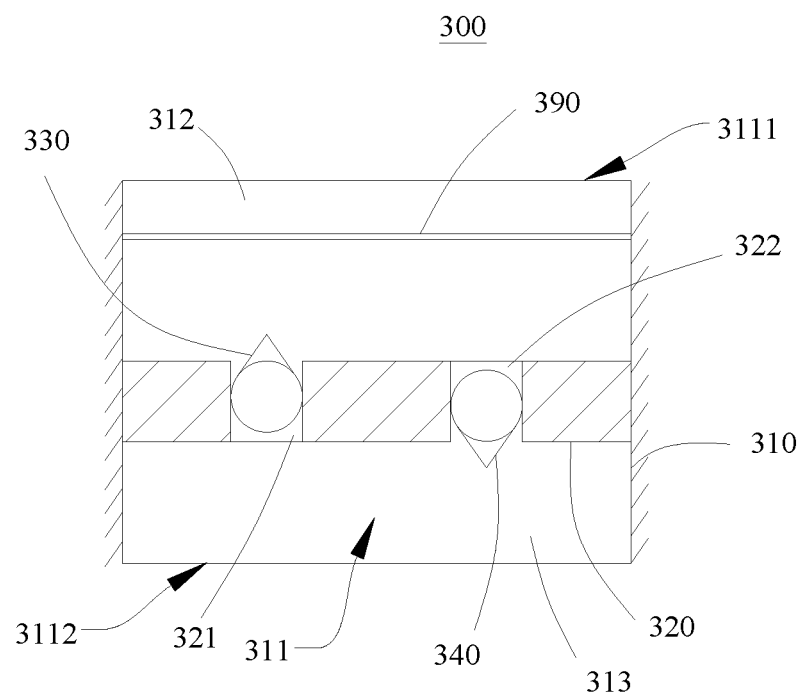
FIG. 3 is a structural diagram of an embodiment of a valve provided by an embodiment of the present application.

Referring to FIG. 3, it is a structural diagram of a valve 300 of the present application. The valve 300 includes a valve body 310, a barrier 320, a first unidirectional valve core 330 and a second unidirectional valve core 340. The valve body 310 includes a fluid channel 311 that includes a first end 3111 and a second end 3112 opposite to each other, the first fluid channel is used for communicating the inside of the battery box with the outside, the first end 3111 is used for extending into the inside of the battery box and in fluid communication with the inside of the box, and the second end 3112 is used for fluid communication with the outside. A barrier 320 is disposed in the fluid channel 311 and divides the fluid channel 311 into a first cavity 312 and a second cavity 313. The barrier 320 is provided with a first through hole 321 and a second through hole 322 communicating the first cavity 312 and the second cavity 313. The first unidirectional valve core 330 is configured to close or open the first through hole 321, and when the first unidirectional valve core 330 opens the first through hole 321, fluid can flow unidirectionally in the fluid channel 311 through the first through hole 321. The second unidirectional valve core 340 is configured to close or open the second through hole 322, and when the second unidirectional valve core 340 opens the second through hole 322, fluid can flow unidirectionally in the fluid channel 311 through the second through hole 322. Opening directions of the first unidirectional valve core 330 and the second unidirectional valve core 340 are opposite, so that fluid can flow bi-directionally in the fluid channel 311, and thus the difference between the fluid pressure at the first end 3111 and the fluid pressure at the second end 3112 is within a preset range. That is, the first unidirectional valve core 330 and the second unidirectional valve core 340 are used to achieve the difference between the fluid pressure at the first end 3111 and the fluid pressure at the second end 3112 within a preset range.

It should be noted that "opening directions of the first unidirectional valve core 330 and the second unidirectional valve core 340 are opposite" here means that when the first unidirectional valve core 330 is opened, a flow direction of fluid in the fluid channel 311 is from the first end 3111 to the second end 3112, and when the second unidirectional valve core 340 is opened, the flow direction of fluid in the fluid channel 311 is from the second end 3112 to the first end 3111. Alternatively, "opening directions of the first unidirectional valve core 330 and the second unidirectional valve core 340 are opposite" may be understood to mean that movement directions of the first unidirectional valve core 330 and the second unidirectional valve core 340 are opposite.

It is provided that the first cavity 312 is communicated with the first end 3111 and the second cavity 313 is communicated with the second end 3112. When the difference between the fluid pressure of the first end 3111 and the fluid pressure of the second end 3112 (hereinafter, D is used to denote the difference between the fluid pressure at the first end 3111 and the fluid pressure at the second end 3112 for simplicity), is within the preset range, i.e., when D is within the preset range, the first unidirectional valve core 330 closes the first through hole 321 and the second unidirectional valve core 340 closes the second through hole 322 so that the fluid channel 311 is blocked and fluid cannot flow between the first cavity 312 and the second cavity 313. When D is not within the preset range and the fluid pressure at the first end 3111 is greater than the fluid pressure at the second end 3112, the first unidirectional valve core 330 opens the first through hole 321 so that the first end 3111 and the second end 3112 are in fluid communication, and the fluid flows from the first cavity 312 to the second cavity 313 in the fluid channel 311. When D is not within the preset range and the fluid pressure at the second end 3112 is greater than the fluid pressure at the first end 3111, the second unidirectional valve core 340 opens the second through hole 322 so that the first end 3111 and the second end 3112 are in fluid communication, and the fluid flows from the second cavity 313 to the first cavity 312 in the fluid channel 311.

It should be noted that only when D is not within the preset range, will the first unidirectional valve core 330 or the second unidirectional valve core 340 meet the opening condition and the first unidirectional valve core 330 or the second unidirectional valve core 340 open.

According to the valve 300 provided by the embodiment of the present application, the first unidirectional valve core 330 and the second unidirectional valve core 340 are jointly integrated in the valve body 310, and the overall valve structure is compact. With the structure of the valve 300, only when the fluid pressure difference between the first end 3111 and the second end 3112 is not within the preset range, can the fluid flow in the fluid channel 311, so as to realize the gas exchange between the inside and the outside of the box 210 of the battery 200 and realize the ventilation of the battery 200 (see FIG. 2). When D is within a preset range, both the first unidirectional valve core 330 and the second unidirectional valve core 340 are in a closed state, thereby preventing water vapor from continuously entering the inside of the box 210 of the battery 200, which effectively reduces the water vapor entering the inside of the box 210, thereby reducing the accumulation of condensed water inside the box 210 and prolonging the service life of the battery 200 to which the valve 300 is applied.

Figure 4:
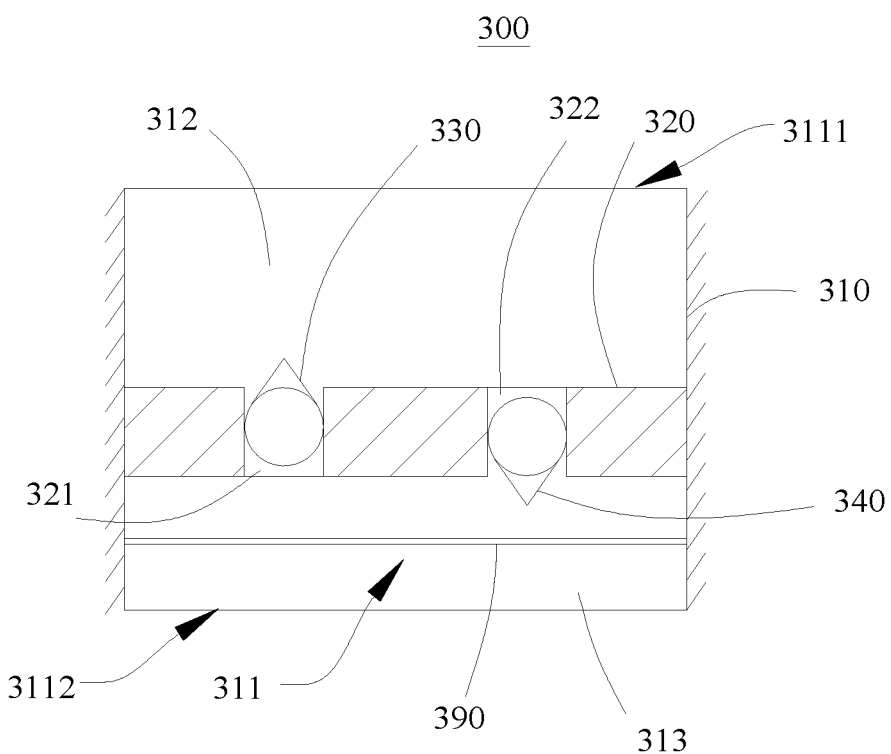
FIG. 4 is a structural diagram of an another embodiment of the valve provided by an embodiment of the present application.
Figure 5:
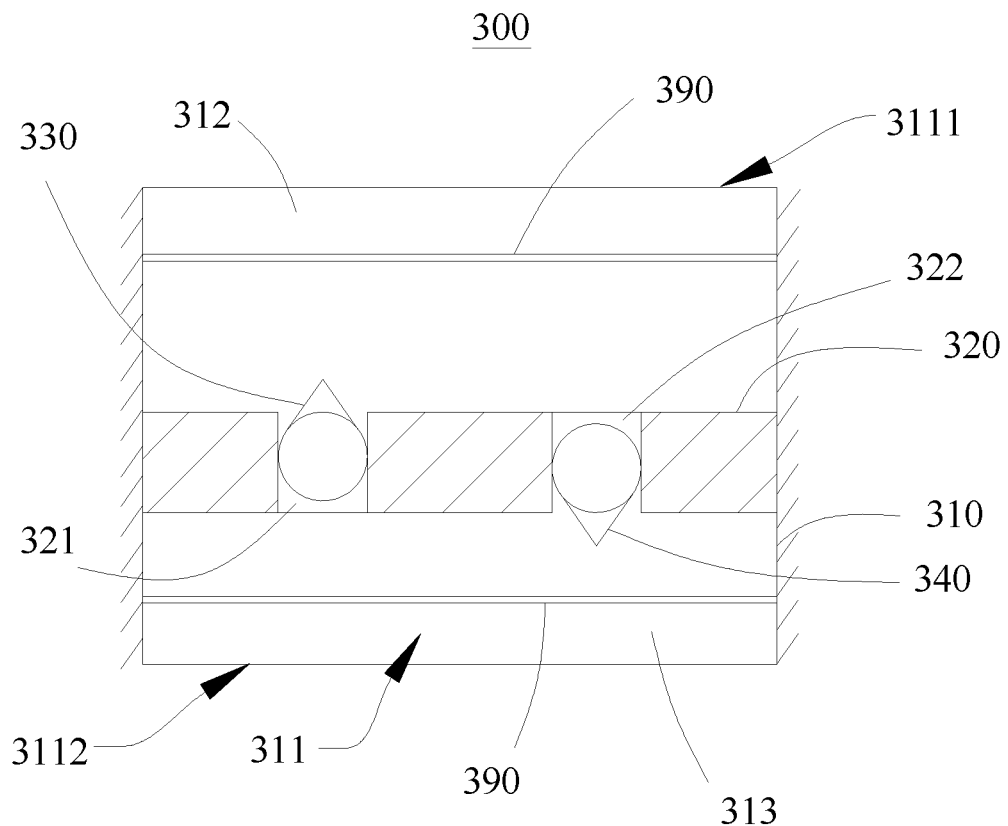
FIG. 5 is a structural diagram of yet an another embodiment of the valve provided by an embodiment of the present application.

In an embodiment, as shown in FIGS. 3, 4, and 5, the valve 300 further includes a breathable film 390 disposed at the first end 3111 and/or the second end 3112. The breathable film 390 can prevent liquid, dust and the like from entering the inside of the box 210 of the battery 200 (see FIG. 2), thereby improving the reliability of the battery 200.

In an embodiment, as shown in FIG. 4, the breathable film 390 is provided at the second end 3112, which can effectively prevent liquid, dust and the like from entering the fluid channel 311 and accumulating between the breathable film 390 and the barrier 320 to form a blockage.

In the present application, the first unidirectional valve core 330 and the second unidirectional valve core 340 may be provided at any appropriate position as long as the gas barrier function described above can be realized.

Figure 6:
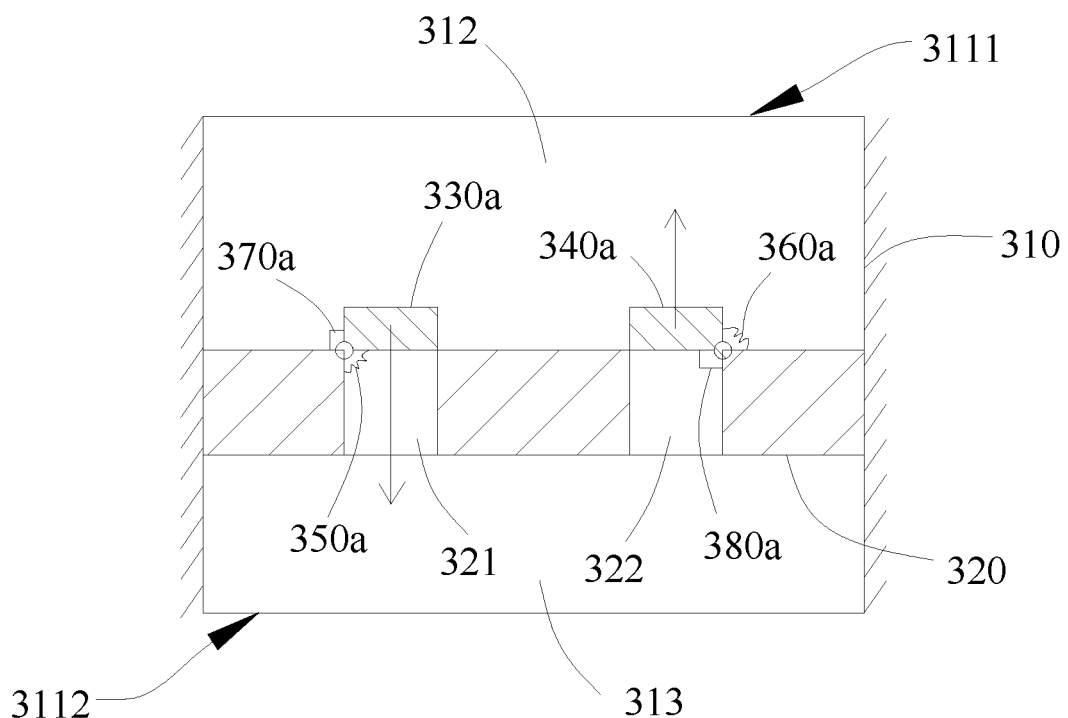
FIG. 6 is a structural schematic diagram of a specific embodiment of the valve provided by an embodiment of the present application.

In an embodiment, as shown in FIG. 6, a first unidirectional valve core 330a and a second unidirectional valve core 340a are located on the same side of the barrier 320, and both the first unidirectional valve core 330a and the second unidirectional valve core 340a are located in the first cavity 312. The valve 300 also includes a first elastic member 350a and a second elastic member 360a. One end of the first unidirectional valve core 330a is connected to the barrier 320 and the other end of the first unidirectional valve core 330a is a free end. The first elastic member 350a is used to hold the first unidirectional valve core 330a in an initial position so that the first unidirectional valve core 330a closes the first through hole 321. One end of the second unidirectional valve core 340a is connected to the barrier 320 and the other end of the second unidirectional valve core 340a is a free end. The second elastic member 360a is used to hold the second unidirectional valve core 340a in an initial position so that the second unidirectional valve core 340a closes the second through hole 322.

By disposing the first unidirectional valve core 330a and the second unidirectional valve core 340a on the same side of the barrier 320, it is easy to realize the assembly of the first unidirectional valve core 330a and the second unidirectional valve core 340a with the barrier 320, which improves the assembly efficiency.

When D is within the preset range, both the first unidirectional valve core 330a and the second unidirectional valve core 340a are in the initial position, the first unidirectional valve core 330a is configured to close the first through hole 321, and the second unidirectional valve core 340a is configured to close the second through hole 322, at this time, the fluid channel 311 is blocked. When D is not within the preset range, and the fluid pressure at the first end 3111 is greater than the fluid pressure at the second end 3112, the first unidirectional valve core 330a is configured to open the first through hole 321, at this time, the second unidirectional valve core 340a is configured to close the second through hole 322, and the fluid can flow from the first cavity 312 to the second cavity 313 via the first through hole 321. When D is not within the preset range, and the fluid pressure at the second end 3112 is greater than the fluid pressure at the first end 3111, the second unidirectional valve core 340a is configured to open the second through hole 322 and the first unidirectional valve core 330a is configured to close the first through hole 321, at this time, the fluid flows from the second cavity 313 to the first cavity 312 via the second through hole 322.

In an embodiment, the valve 300 further includes a first restraint element 370a and a second restraint element 380a in order to realize that the first unidirectional valve core 330a and the second unidirectional valve core 340a can only be opened on one side. The first elastic member 350a is disposed in the first through hole 321, the first restraint element 370a is disposed outside the first through hole 321, and the first unidirectional valve core 330a is hinged with the barrier 320; and when the first unidirectional valve core 330a is in the initial position the first restraint element 370a can prevent the first unidirectional valve core 330a from moving toward the first end 3111. The second elastic member 360*a* is disposed outside the second through hole 322, the second restraint element 380*a* is disposed inside the second through hole 322, and the second unidirectional valve core 340*a* is hinged with the barrier 320; and when the second unidirectional valve core 340*a* is in the initial position, the second restraint element 380*a* can prevent the second unidirectional valve core 340*a* from moving toward the second end 3112.

In other embodiments of the present application, both the first unidirectional valve core 330 and the second unidirectional valve core 340 may also be located in the second cavity 313.

Figure 7:
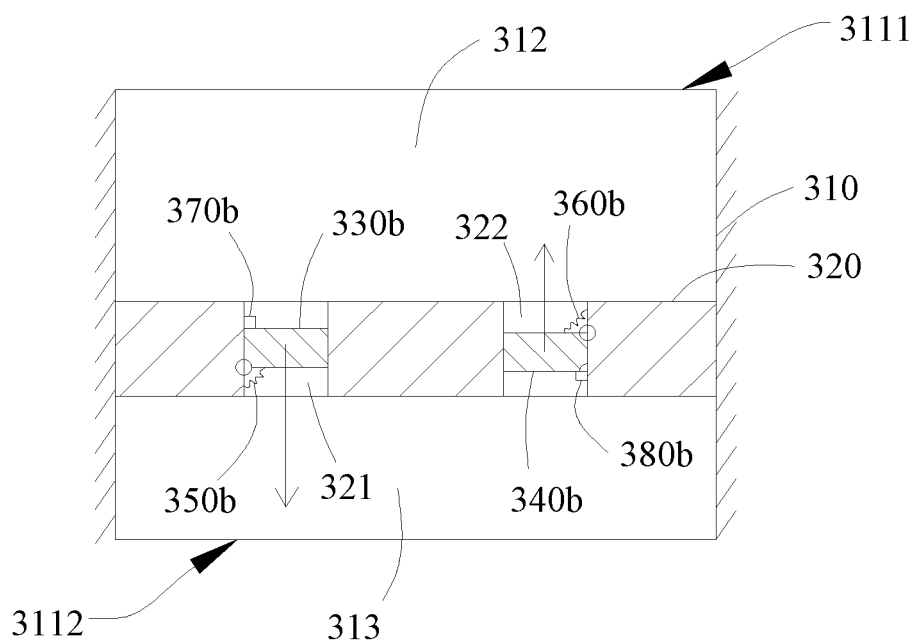
FIG. 7 is a structural schematic diagram of an another specific embodiment of the valve provided by an embodiment of the present application.

In an embodiment, as shown in FIG. 7, the first unidirectional valve core 330*b* is located in the first through hole 321, the second unidirectional valve core 340*b* is located in the second through hole 322, and the valve 300 further includes a first elastic member 350*b* and a second elastic member 360*b*. One end of the first unidirectional valve core 330*b* is connected with the barrier 320, and the other end of the first unidirectional valve core 330*b* is a free end; and the first elastic member 350*b* is used to hold the first unidirectional valve core 330*b* in an initial position. One end of the second unidirectional valve core 340*b* is connected to the barrier 320, and the other end of the second unidirectional valve core 340*b* is a free end; and the second elastic member 360*b* is used to hold the second unidirectional valve core 340*b* in the initial position.

By disposing the first unidirectional valve core 330*b* in the first through hole 321 and the second unidirectional valve core 340*b* in the second through hole 322, the assembly structure of the first unidirectional valve core 330*b* and the second unidirectional valve core 340*b* with the barrier 320 is compact and the occupied space is reduced.

When D is within the preset range, both the first unidirectional valve core 330*b* and the second unidirectional valve core 340*b* are in the initial position, the first unidirectional valve core 330*b* closes the first through hole 321, the second unidirectional valve core 340*b* closes the second through hole 322, and the fluid channel 311 is blocked. When D is not within the preset range, and the fluid pressure at the first end 3111 is greater than the fluid pressure at the second end 3112, the first unidirectional valve core 330*b* is configured to open to enable the fluid to flow from the first cavity 312 to the second cavity 313 via the first through hole 321 until the fluid pressure at the first end 3111 and the fluid pressure at the second end 3112 return to the preset range. When D is not within the preset range, and the fluid pressure at the second end 3112 is greater than the fluid pressure at the first end 3111, the second unidirectional valve core 340*b* is configured to open to enable the fluid to flow from the second cavity 313 to the first cavity 312 via the second through hole 322 until the fluid pressure at the second end 3112 and the fluid pressure at the first end 3111 return to the preset range.

In an embodiment, the valve further includes a first restraint element 370*b* and a second restraint element 380*b* in order to realize that the first unidirectional valve core 330*b* and the second unidirectional valve core 340*b* can only be opened on one side. The first restraint element 370*b* is disposed on a side of the first unidirectional valve core 330*b* close to the first end 3111, and can prevent the first unidirectional valve core 330*b* from moving toward the first end 3111 when the first unidirectional valve core 330*b* is in the initial position. The second restraint element 380*b* is disposed on a side of the second unidirectional valve core 340*b* close to the second end 3112, and can prevent the second unidirectional valve core 340*b* from moving toward the second end 3112 when the second unidirectional valve core 340*b* is in the initial position.

In one embodiment, the first unidirectional valve core 330 and the second unidirectional valve core 340 are respectively located on both sides of the barrier 320, the first unidirectional valve core 330 is disposed in the second cavity 313, and the second unidirectional valve core 340 is disposed in the first cavity 312. The first unidirectional valve core 330 and the second unidirectional valve core 340 are located in different cavities to facilitate opening the first unidirectional valve core 330 or the second unidirectional valve core 340 depending on the pressure of the fluid. In other embodiments of the present application, the first unidirectional valve core 330 may be disposed in the first cavity 312, and the second unidirectional valve core 340 may be disposed in the second cavity 313.

Figure 8:
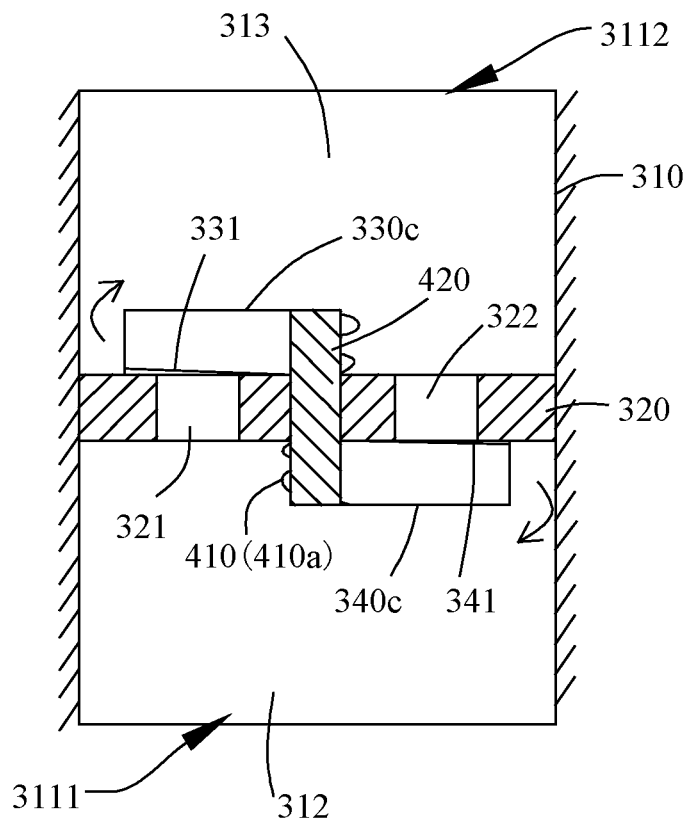
FIG. 8 is a structural schematic diagram of yet an another specific embodiment of the valve provided by an embodiment of the present application.
Figure 9:
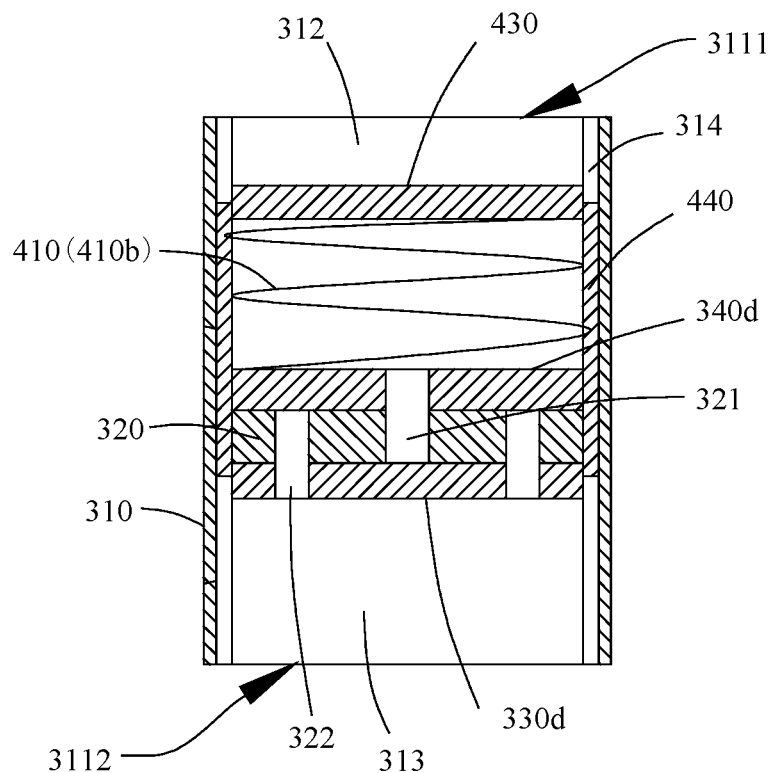
FIG. 9 is a structural schematic diagram of a connecting rod of a further specific embodiment of the valve provided by an embodiment of the present application.

In an embodiment, as shown in FIGS. 8 and 9, the valve 300 further includes an elastic return member 410 shared by the first unidirectional valve core 330 and the second unidirectional valve core 340. The elastic return member 410 tends to hold the first unidirectional valve core 330 at a position closing the first through hole 321 and the second unidirectional valve core 340 at a position closing the second through hole 322. The first unidirectional valve core 330 and the second unidirectional valve core 340 share one elastic return member 410, which is compact in structure, saves costs, and is easy to install.

The elastic return member 410 may be of any suitable structure as long as it can tend to hold the first unidirectional valve core 330 at a position closing the first through hole 321 and the second unidirectional valve core 340 at a position closing the second through hole 322.

In an embodiment, as shown in FIG. 8, the elastic return member 410*a* is a torsion spring, and the valve 300 further includes a rotating shaft 420, which is penetrated through the barrier 320, and both ends of the rotating shaft 420 are respectively located in the first cavity 312 and the second cavity 313. The first unidirectional valve core 330*c* is rotationally connected with one end of the rotating shaft 420, and the second unidirectional valve core 340*c* is rotationally connected to the other end of the rotating shaft 420; and one arm of the torsion spring is connected with the first unidirectional valve core 330*c* and the other arm of the torsion spring is connected with the second unidirectional valve core 340*c*.

With the structure of the valve, when D is not within the preset range, and the fluid pressure at the first end 3111 is greater than the fluid pressure at the second end 3112, the fluid can push the first unidirectional valve core 330*c* to rotate about the rotating shaft 420, thereby opening the first through hole 321, so that the fluid flows from the first cavity 312 to the second cavity 313 through the first through hole 321. With the flow of the fluid, the fluid pressure at the first end 3111 tends to balance with the fluid pressure at the second end 3112. When D returns to the preset range, the torsion spring can drive the first unidirectional valve core 330*c* to reset to close the first through hole 321. When D is not within the preset range, and the fluid pressure at the second end 3112 is greater than the fluid pressure at the first end 3111, the fluid can also push the second unidirectional valve core 340*c* to rotate about the rotating shaft 420, thereby opening the second through hole 322, so that the fluid flows from the second cavity 313 to the first cavity 312 through the second through hole 322. With the flow of the fluid, the fluid pressure at the second end 3112 tends to balance with the fluid pressure at the first end 3111. When D returns to the preset range, the torsion spring can drive the second unidirectional valve core 340c to reset to close the second through hole 322.

As shown in FIG. 8, the first unidirectional valve core 330c includes a first ramp 331 that shields the first through hole 321 when the first unidirectional valve core 330c is in the initial position. When the fluid acts on the first ramp 331, the first unidirectional valve core 330 can rotate clockwise relative to the barrier 320 due to the uneven force exerted on the first unidirectional valve core 330, thereby opening the first through hole 321, so that the fluid can flow from the first cavity 312 to the second cavity 313 via the first through hole 321. When D is within the preset range, the torsion spring drives the first unidirectional valve core 330 to rotate counterclockwise relative to the barrier 320 to close the first through hole 321. The second unidirectional valve core 340c includes a second ramp 341 that shields the second through hole 322 when the second unidirectional valve core 340c is in the initial position. When the fluid acts on the second ramp 341, the second unidirectional valve core 340c can rotate clockwise relative to the barrier 320 due to the uneven force exerted on the second unidirectional valve core 340c, thereby opening the second through hole 322, so that the fluid can flow from the second cavity 313 to the first cavity 312 via the second through hole 322. When D is within the preset range, the torsion spring drives the second unidirectional valve core 340c to rotate counterclockwise relative to the barrier 320 to close the second through hole 322.

Figure 10:
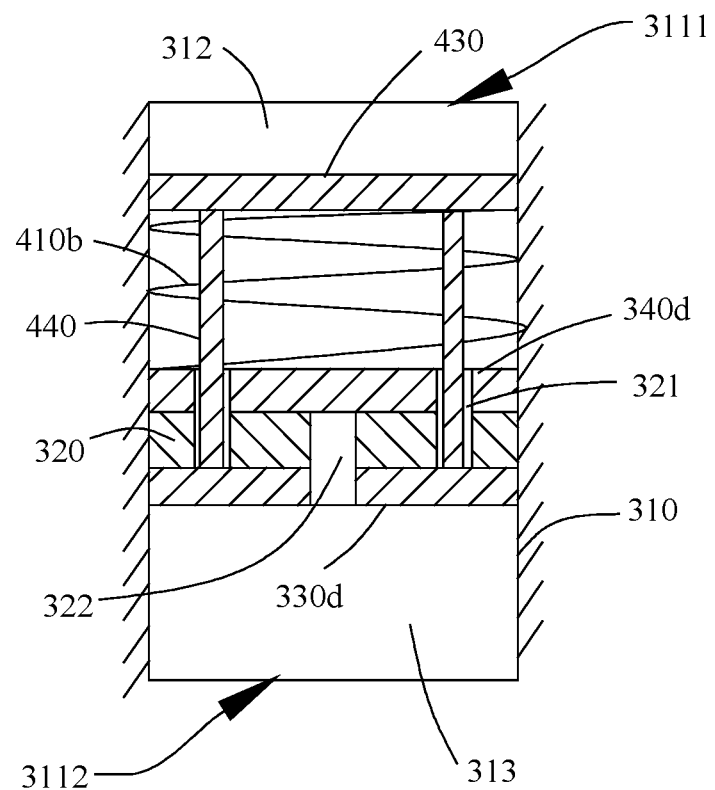
FIG. 10 is an another structural schematic diagram of the connecting rod of the further specific embodiment of the valve provided by an embodiment of the present application.
Figure 11:
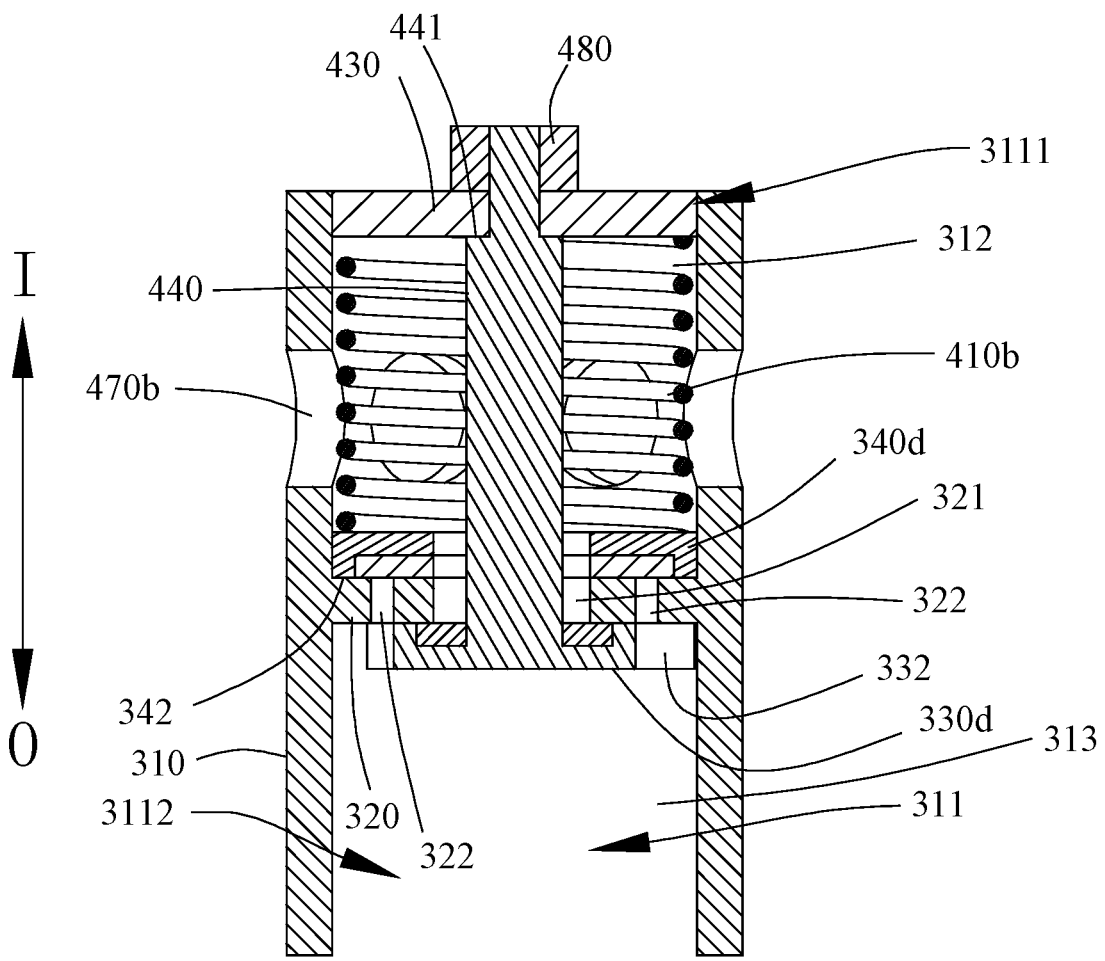
FIG. 11 is yet an another structural schematic diagram of the connecting rod of the further specific embodiment of the valve provided by an embodiment of the present application.

In an embodiment, as shown in FIGS. 9, 10 and 11, the elastic return member 410b is a coil spring. The valve 300 further includes a support base 430 disposed in the first cavity 312 and is linked with the first unidirectional valve core 330d. An elastic return member 410b is disposed in the first cavity 312, one end of the elastic return member 410b abuts against the second unidirectional valve core 340d, and the other end of the elastic return member 410b abuts against the support base 430. The support base 430 is disposed to facilitate the installation and positioning of the elastic return member 410b, and the first unidirectional valve core 330d and the second unidirectional valve core 340d share the elastic return member 410b through the support base 430.

In an embodiment, the support base 430 is in sliding fit with an inner wall of the fluid channel 311. An edge of the support base 430 is limited by the inner wall of the fluid channel 311, to ensure a stable movement of the support base 430.

In an embodiment, the valve 300 further includes a connection member 440, one end of the connection member 440 is connected with the support base 430, the other end of the connection member 440 is connected with the first unidirectional valve core 330d, and the support base 430 is linked with the first unidirectional valve core 330d through the connection member 440. By disposing the connection member 440, it is possible to realize a linkage cooperation between the support base 430 and the first unidirectional valve core 330d.

The connection member 440 may be disposed in a variety of positions and may be located at any adaptive position.

In an embodiment, as shown in FIG. 9, the inner wall of the valve body 310 is provided with a chute 314, and the connection member 440 is slidably disposed in the chute 314, and both ends of the connection member 440 are respectively located on both sides of the barrier 320. The chute 314 is provided so that the connection member 440 moves stably.

In another embodiment, as shown in FIGS. 10 and 11, the connection member 440 passes through the barrier 320, one end of the connection member 440 is connected with the first unidirectional valve core 330d, and the other end of the connection member 440 passes through the barrier 320 and is connected with the support base 430. The connection member 440 disposed in such as way is simple in structure, makes reasonable use of the installation space, and ensures a stable linkage between the support base 430 and the first unidirectional valve core 330d.

It should be noted that one end of the connection member 440 may be fixedly connected or integrally formed with the first unidirectional valve core 330d and the other end may be detachably connected with the support base 430. Alternatively, one end of the connection member 440 may be detachably connected with the first unidirectional valve core 330d and the other end may be fixedly connected or integrally formed with the support base 430. In an embodiment, as shown in FIG. 11, one end of the connection member 440 is integrally formed with the first unidirectional valve core 330d, and the other end of the connection member 440 is detachably connected with the support base 430 through a locking element 480 (which may be a nut, a pin, etc.), which both facilitates installation and ensures the stability of the connection of the connection member 440. An end of the connection member 440 facing away from the first unidirectional valve core 330d is provided with a male thread and a step 441, the male thread extends from the end of the connection member 440 to the step 441. The locking element 480 is provided with a threaded hole corresponding to the male thread, and the locking element 480 is threadedly engaged with the connection member 440 and presses the support base 430 on the step 441. In an embodiment of the present application, the locking element 480 is a nut for easy operation while ensuring a firm connection.

In an embodiment, as shown in FIGS. 10 and 11, the connection member 440 passes through the first through hole 321, a cross-sectional area of the first through hole 321 is larger than that of the connection member 440. The connection member 440 is located in the first through hole 321, so that the barrier 320 does not need to separately define a hole for the connection member 440 to penetrate, and the processing difficulty is reduced.

In an embodiment, as shown in FIG. 11 the first through hole 321 is disposed at a center of the barrier 320. The first through hole 321 is not only used for gas circulation, but also for penetrating the connection member 440. The position of the first through hole 321 makes the structure of the barrier 320 simple and does not need to define a plurality of first through holes 321. Moreover, an action surface of the gas acting on the first unidirectional valve core is annular, which ensures that the first unidirectional valve core 330 is uniformly stressed and makes the first unidirectional valve core move smoothly.

In other embodiments of the present application, as shown in FIG. 10, the second through hole 322 may be disposed at a center of the barrier 320, and the first through hole 321 may be disposed near the edge of the barrier 320.

Figure 12:
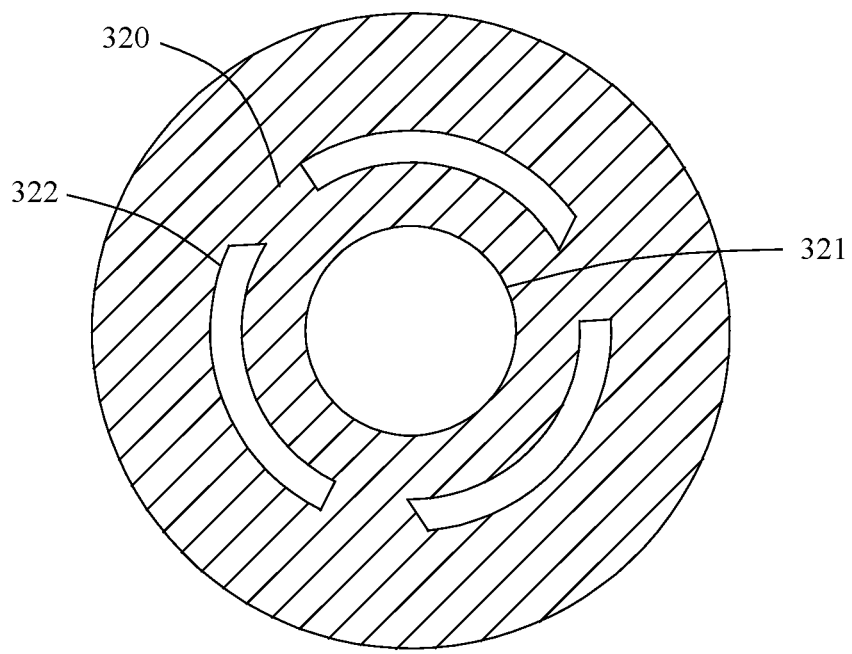
FIG. 12 is a sectional view of a barrier of FIG. 11.

In an embodiment, as shown in FIGS. 11 and 12, the number of second through holes 322 is multiple, and a plurality of second through holes 322 are disposed at intervals around the center of the barrier 320. A plurality of second through holes 322 are provided to ensure that a force balance of the second unidirectional valve core 340d, so as to stably open the second through hole 322.

In an embodiment, as shown in FIG. 12, the second through hole 322 is a bar-shaped hole, and the second through hole 322 extends along a circumferential direction of the barrier 320. Compared with circular holes, the bar-shaped hole has a larger flow area.

Figure 13:
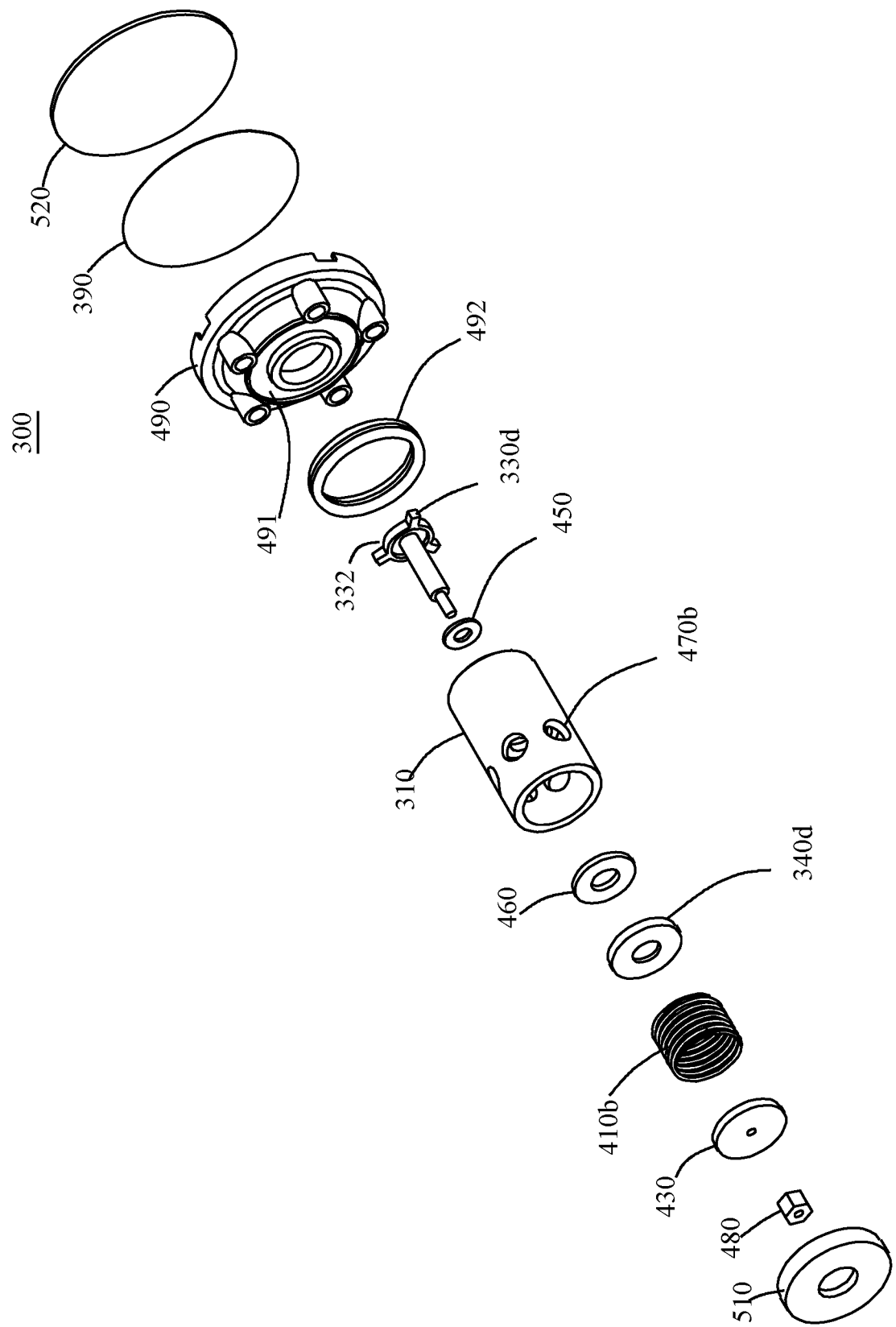
FIG. 13 is an explosion diagram of the valve provided by an embodiment of the present application.
Figure 14:
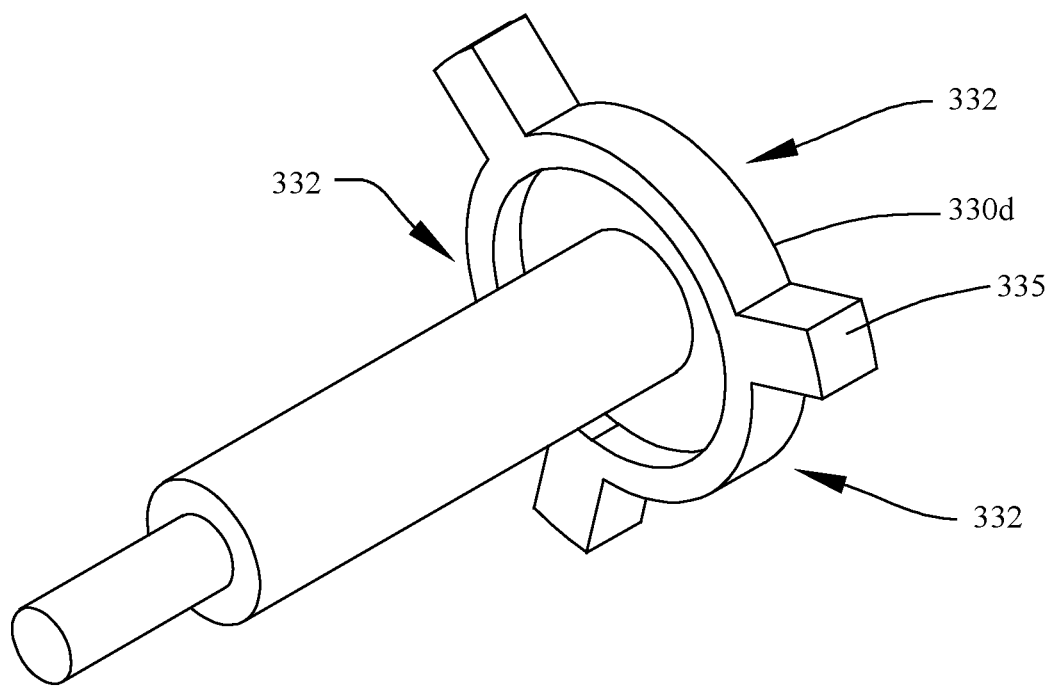
FIG. 14 is a schematic structural diagram of a first unidirectional valve core of FIG. 13.

Please refer to FIG. 13, it is an explosion diagram of the valve according to an embodiment of the present application. The first unidirectional valve core 330*d* is provided with avoidance portions 332 distributed at intervals in the circumferential direction of the first unidirectional valve core 330*d* as shown in FIG. 14. When the first unidirectional valve core 330*d* is assembled with the barrier 320, the avoidance portion 332 is configured to communicate with the second through hole 322. As shown in FIG. 11, the first unidirectional valve core 330*d* is in sliding fit with the inner wall of the fluid channel 311. The avoidance portion 332 is disposed to facilitate the flow of fluid into the second through hole 322 via the avoidance portion 332. The edge of the first unidirectional valve core 330*d* is limited by the inner wall of the fluid channel 311, such that the first unidirectional valve core 330*d* moves stably relative to the fluid channel 311.

Figure 15:
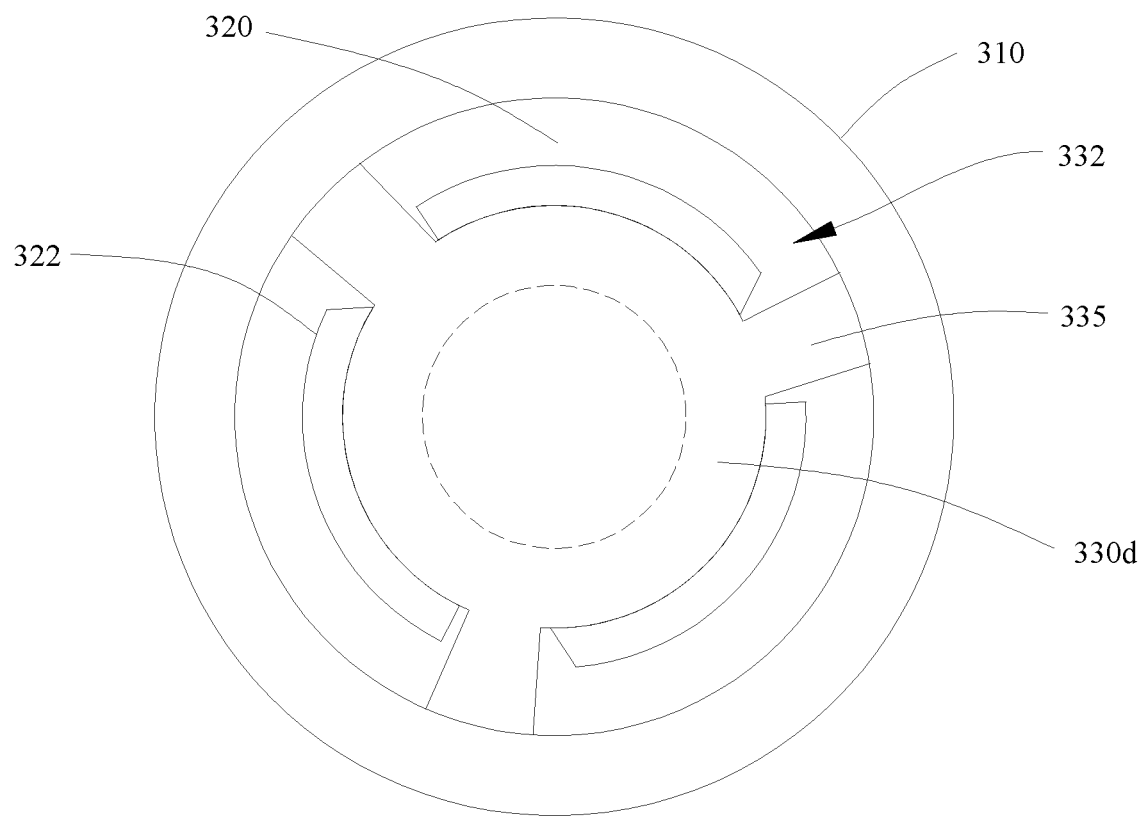
FIG. 15 is a schematic diagram of fitting of the first unidirectional valve core and the barrier of the valve provided by an embodiment of the present application.

In some embodiments, as shown in FIG. 15, the avoidance portion 332 is positioned in correspondence with the position of the second through hole 322, such that the first unidirectional valve core 330*d* will not shield the second through hole 322. Bumps 335 are formed on an outer circumferential surface of the first unidirectional valve core 330*d*, which are distributed at intervals in the circumferential direction of the first unidirectional valve core 330*d*. The bumps 335 abut against the inner wall of the fluid channel. The bumps 335 are staggered with the second through holes 322, and the avoidance portion 332 is formed between two adjacent protrusions 335.

Figure 16:
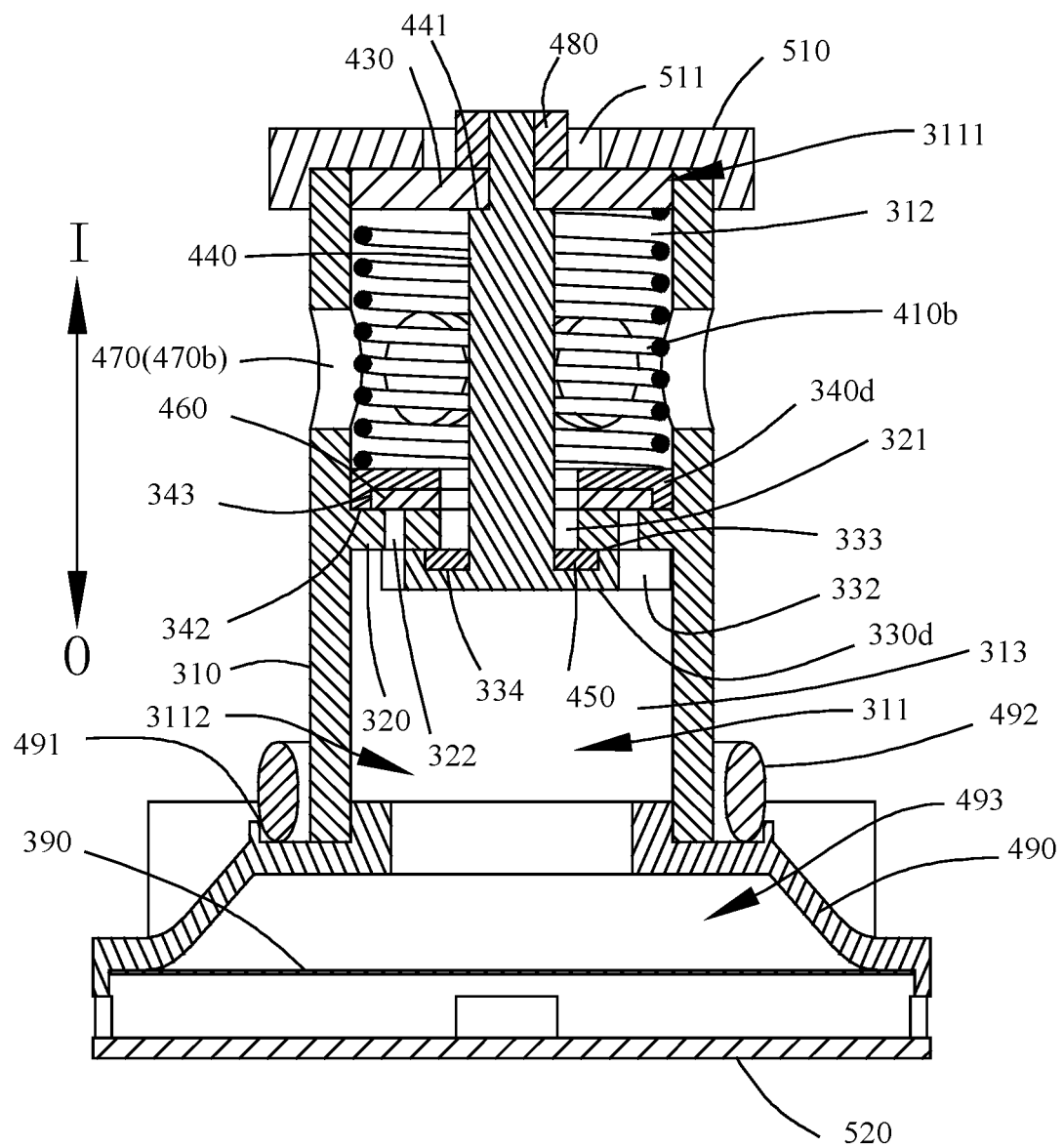
FIG. 16 is a sectional view of the valve provided by an embodiment of the present application in an assembled state.

In an embodiment, as shown in FIG. 16, the second unidirectional valve core 340*d* is in sliding fit with the inner wall of the fluid channel 311. The edge of the second unidirectional valve core 340*d* is limited by the inner wall of the fluid channel 311, to ensure a stable movement of the second unidirectional valve core 340*d* relative to the fluid channel 311.

In an embodiment, as shown in FIGS. 13 and 16, the valve 300 further includes a first sealing gasket 450 and a second sealing gasket 460. The first sealing gasket 450 is mounted to the first unidirectional valve core 330*d*, and the first sealing gasket 450 is configured to seal a joint of the first unidirectional valve core 330*d* and the barrier 320 when the first unidirectional valve core 330*d* is closed. The second sealing gasket 460 is mounted to the second unidirectional valve core 340*d*, and the second sealing gasket 460 is configured to seal a joint of the second unidirectional valve core 340*d* and the barrier 320 when the second unidirectional valve core 340*d* is closed. The first sealing gasket 450 is disposed so that the sealing effect between the first unidirectional valve core 330*d* and the barrier 320 is good. The second sealing gasket 460 is disposed so that the sealing effect between the second unidirectional valve core 340*d* and the barrier 320 is good.

In some embodiments, as shown in FIG. 16, the first unidirectional valve core 330*d* includes a first surface 333 facing the barrier 320, the first surface 333 is provided with a first groove 334, the first sealing gasket 450 is embedded in the first groove 334, and the first sealing gasket 450 protrudes from the first surface 333 when the first unidirectional valve core 330*d* is opened. As shown in FIG. 11, the second unidirectional valve core 340*d* includes a second surface 342 facing the barrier 320, the second surface 342 is provided with a second groove 343, the second sealing gasket 460 is embedded in the second groove 343, and the second sealing gasket 460 protrudes from the second surface 342 when the second unidirectional valve core 340*d* is opened.

The first sealing gasket 450 and the second sealing gasket 460 are disposed in such a manner that a compression margin is reserved to ensure good sealing performance between the first unidirectional valve core 330*d* and the barrier 320 and between the second unidirectional valve core 340*d* and the barrier 320, so that the sealing reliability between the first unidirectional valve core 330*d* and the barrier 320 and between the second unidirectional valve core 340*d* and the barrier 320 are high. Since an axial sealing mode is adopted, frictions between the first sealing gasket 450 and the barrier 320 and between the second sealing gasket 460 and the barrier 320 are eliminated, and the long-term reciprocating sealing reliability is increased.

In an embodiment, the barrier 320 is integrally formed with the valve body 310 to facilitate manufacturing. In other embodiments, the barrier 320 and the valve body 310 may be fixedly connected by welding, bonding, bolting, snapping or the like.

Figure 17:
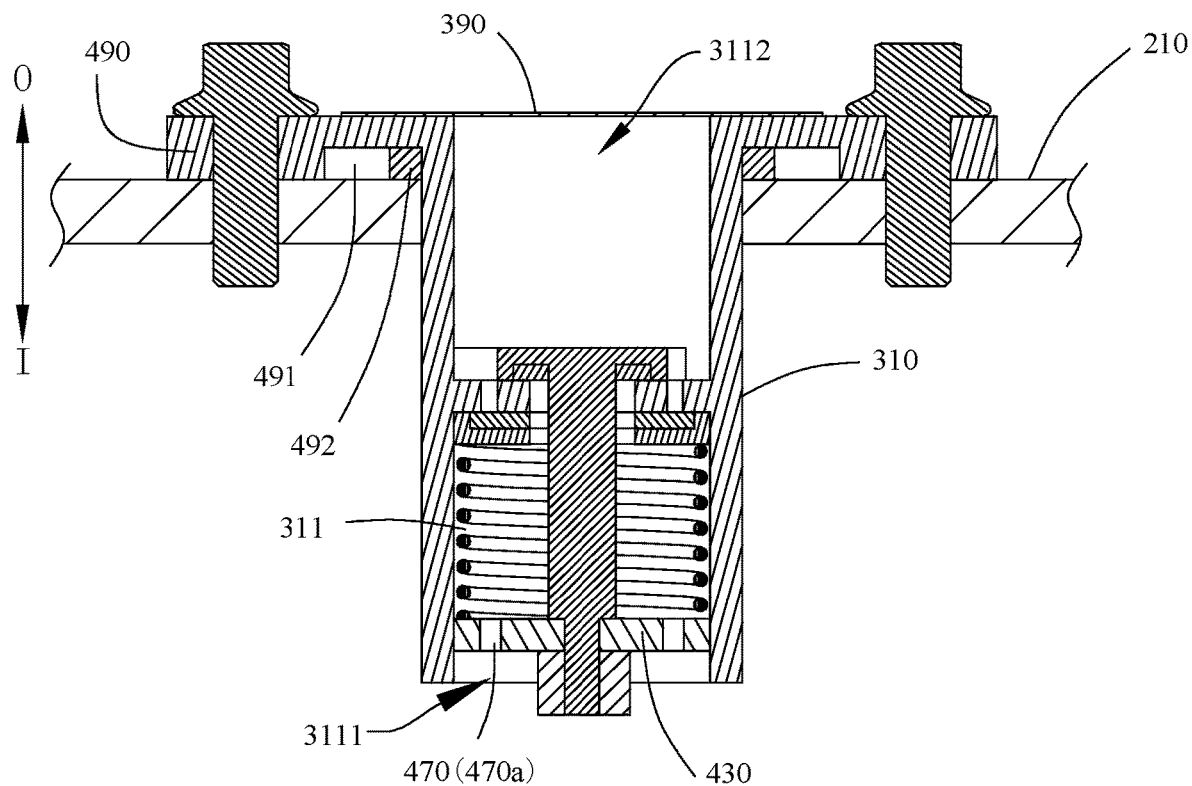
FIG. 17 is a structural schematic diagram of a vent hole of the valve provided by an embodiment of the present application.

In an embodiment of the present application, as shown in FIGS. 16 and 17, the valve 300 further includes a vent hole 470 for communicating the inside of the battery box with the fluid channel 311, and the vent hole 470 may be provided at any suitable position.

In an embodiment, as shown in FIG. 17, a vent hole 470*a* is disposed on the support base 430, and the vent hole 470*a* penetrates through the support base 430 for communicating the inside of the battery box with the fluid channel 311, so as to realize the ventilation between the inside of the battery box and the outside.

Figure 18:
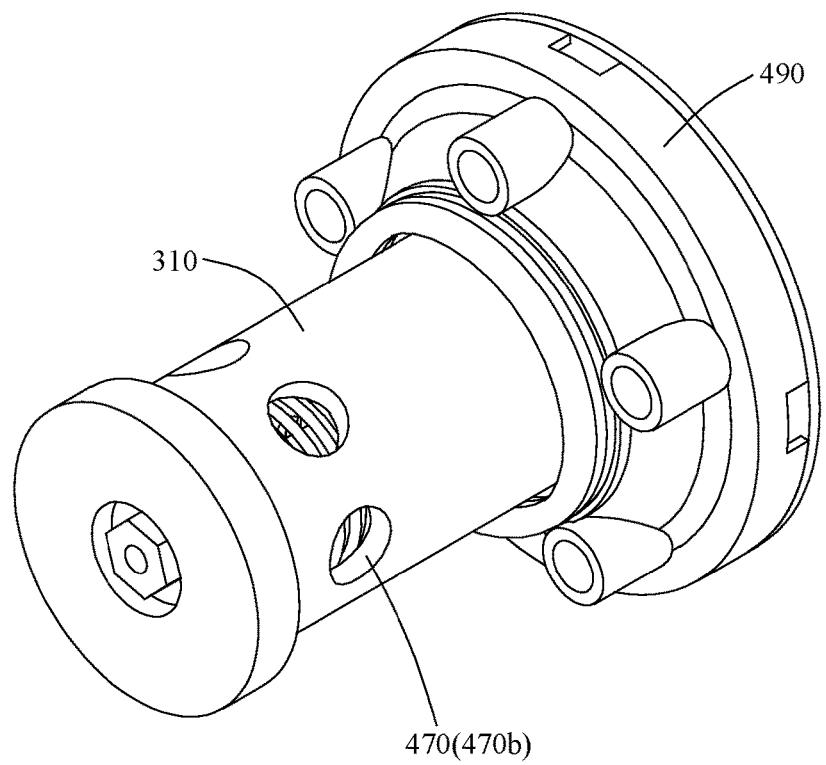
FIG. 18 is an assembly diagram of the valve according to an embodiment of the present application.

In an embodiment, as shown in FIGS. 16 and 18, a vent hole 470*b* is disposed on a side wall of the valve body 310, the vent hole 470*b* is communicated with the first cavity 312, and the vent hole 470*b* is located inside the box when the valve 300 is applied to the box of the battery. The gas inside the box enters the fluid channel 311 through the vent hole 470*b* and then flows from the first cavity 312 to the second cavity 313 through the first through hole 321 and to the outside. Alternatively, the outside gas enters the inside of the box via the fluid channel 311 and the vent hole 470*b*. During assembly, part of the valve body 310 is located in the box, and the vent hole 470*b* provided in the side wall is closer to the inner wall of the box, in this setting manner, the effect of preventing foreign matter from entering the fluid channel 311 through the vent hole 470*a* provided in the support base 430 close to the first end 3111 can be improved, as compared with the vent hole 470*a* provided in the support base 430 close to the first end 3111.

In an embodiment, as shown in FIGS. 13, 16 and 17, the valve 300 further includes a mounting base 490 for mounting the valve 300 on the battery box, and the mounting mode can be bolted connection, welding, etc.

In an embodiment, as shown in FIGS. 13, 16 and 17, the mounting base 490 is provided with an annular mounting slot 491 in which a sealing ring 492 is provided. As shown in FIG. 2, the sealing ring 492 is used to seal the valve body 310 and the box 210 when the valve 300 is mounted to the box 210.

In an embodiment, as shown in FIG. 16, the mounting base 490 is provided with a ventilation channel 493 in communication with the fluid channel 311; the gas inside the box of the battery can flow into the ventilation channel 493 via the fluid channel 311 and be discharged to the outside, or the outside gas can enter the fluid channel 311 via the ventilation channel 493 and enter the box of the battery.

The mounting base 490 may be connected to the valve body 310 in any suitable form.

In an embodiment, as shown in FIGS. 13 and 16, the mounting base 490 and the valve body 310 are two separate components, and the mounting base 490 is fixedly connected (bolted, welded, etc.) and in a sealed fit with the valve body 310.

In an embodiment, as shown in FIG. 17, the mounting base 490 is integrally formed with the valve body 310.

In an embodiment, the breathable film 390 is disposed at the second end 3112, and as shown in FIG. 16, the breathable film 390 is mounted in the mounting base 490; as shown in FIG. 17, the breathable film 390 is mounted on an end of the mounting base 490 close to the outside, in these setting manners, it is possible to effectively prevent impurities such as dust from entering the fluid channel 311 and prevent impurities from accumulating in the fluid channel 311.

In some embodiments, as shown in FIGS. 13 and 16, the valve 300 further includes an end cap 510 disposed at the first end 3111 of the fluid channel 311, the end cap 510 blocks the first end 3111, the end cap 510 is detachably connected with the valve body 310. The end cap 510 is provided with an avoidance hole 511, in the initial state, the support base 430 is disposed to abut against the end cap 510, and the locking element 480 is penetrated into the avoidance hole 511.

In an embodiment, as shown in FIGS. 13 and 16, the valve 300 further includes a protective cover 520 which covers and disposed on an open end of the mounting base 490 for protecting the breathable film 390. The protective cover 520 is detachably connected to the mounting base to facilitate maintenance or replacement of the breathable film 390.

It should be noted that the breathable film 390 referred to in the present application is a waterproof breathable film, which allows only gas to pass through and does not allow moisture to pass through.

It should be noted that although only the scenario where the valve 300 is applied to a battery has been described above, the present application is not limited thereto, and the valve 300 may also be applied to other devices including a sealed cavity.

It should be noted that the features in the embodiments of the present application may be combined with each other without conflict.

The above are only preferred embodiments of the present application and are not intended to limit the present application, various modifications and variations of the present application will be apparent to those skilled in the art. Any modification, equivalent replacement, improvement, etc. made within the spirit and principles of the present application shall be included in the scope of protection of the present application.

What is claimed is:

1. A valve, comprising:
   a valve body comprising a fluid channel, the fluid channel comprising a first end and a second end;
   a barrier disposed in the fluid channel and separating the fluid channel into a first cavity and a second cavity, wherein the first cavity is in fluid communication with the first end, the second cavity is in fluid communication with the second end, and the barrier is provided with a first through hole and a second through hole communicating the first cavity and the second cavity;
   a first unidirectional valve core configured to close or open the first through hole; and
   a second unidirectional valve core configured to close or open the second through hole, opening directions of the first unidirectional valve core and the second unidirectional valve core being opposite such that a difference between a fluid pressure at the first end and a fluid pressure at the second end is within a preset range;
   an elastic return member shared by the first unidirectional valve core and the second unidirectional valve core, the elastic return member tending to hold the first unidirectional valve core at a position closing the first through hole and hold the second unidirectional valve core at a position closing the second through hole;
   wherein the valve further comprises:
   a support base disposed in the first cavity and linked with the first unidirectional valve core;
   wherein the elastic return member is disposed in the first cavity, one end of the elastic return member abuts against the second unidirectional valve core, and an other end of the elastic return member abuts against the support base;
   wherein the support base is in sliding fit with an inner wall of the fluid channel;
   wherein the second unidirectional valve core is in sliding fit with an inner wall of the fluid channel.

2. The valve according to claim 1, wherein the first unidirectional valve core is disposed in the second cavity and the second unidirectional valve core is disposed in the first cavity.

3. The valve according to claim 1, wherein the valve further comprises: a connection member, one end of the connection member being connected with the support base, an other end of the connection member being connected with the first unidirectional valve core, and the support base being linked with the first unidirectional valve core through the connection member.

4. The valve according to claim 3, wherein the connection member passes through the barrier.

5. The valve according to claim 4, wherein the connection member passes through the first through hole, and a cross-sectional area of the first through hole is greater than a cross-sectional area of the connection member.

6. The valve according to claim 1, wherein the first through hole is disposed at a center of the barrier.

7. The valve according to claim 1, wherein a number of the second through holes is multiple, and a plurality of the second through holes are disposed at intervals around the center of the barrier.

8. The valve according to claim 7, wherein the first unidirectional valve core is provided with an avoidance portion, the avoidance portion communicates with the second through hole, and the first unidirectional valve core is in sliding fit with an inner wall of the fluid channel.

9. The valve according to claim 1, wherein the valve further comprises:
   a first sealing gasket mounted to the first unidirectional valve core and configured to seal a joint of the first unidirectional valve core and the barrier when the first unidirectional valve core is closed.

10. The valve according to claim 9, wherein the first unidirectional valve core comprises a first surface facing the barrier, the first surface is provided with a first groove, the first sealing gasket is embedded in the first groove, and the first sealing gasket protrudes from the first surface when the first unidirectional valve core is opened.

11. The valve according to claim 1, wherein the valve further comprises:
   a second sealing gasket mounted to the second unidirectional valve core and configured to seal a joint of the second unidirectional valve core and the barrier when the second unidirectional valve core is closed.

12. The valve according to claim 11, wherein the second unidirectional valve core comprises a second surface facing the barrier, the second surface is provided with a second groove, the second sealing gasket is embedded in the second groove, and the second sealing gasket protrudes from the second surface when the second unidirectional valve core is opened.

13. The valve according to claim 1, wherein the barrier is integrally formed or fixedly connected with the valve body.

14. The valve according to claim 1, wherein the valve further comprises:
a breathable film disposed at the first end and/or the second end.

15. A battery comprising:
a box,
a battery cell, the battery cell being disposed in the box, and
a valve, the valve being disposed on the box, and the valve comprising:
a valve body comprising a fluid channel, the fluid channel comprising a first end and a second end;
a barrier disposed in the fluid channel and separating the fluid channel into a first cavity and a second cavity, wherein the first cavity is in fluid communication with the first end, the second cavity is in fluid communication with the second end, and the barrier is provided with a first through hole and a second through hole communicating the first cavity and the second cavity;
a first unidirectional valve core configured to close or open the first through hole; and
a second unidirectional valve core configured to close or open the second through hole, opening directions of the first unidirectional valve core and the second unidirectional valve core being opposite such that a difference between a fluid pressure at the first end and a fluid pressure at the second end is within a preset range;
an elastic return member shared by the first unidirectional valve core and the second unidirectional valve core, the elastic return member tending to hold the first unidirectional valve core at a position closing the first through hole and hold the second unidirectional valve core at a position closing the second through hole;
a support base disposed in the first cavity and linked with the first unidirectional valve core;
wherein the elastic return member is disposed in the first cavity, one end of the elastic return member abuts against the second unidirectional valve core, and an other end of the elastic return member abuts against the support base;
wherein the support base is in sliding fit with an inner wall of the fluid channel;
wherein the second unidirectional valve core is in sliding fit with an inner wall of the fluid channel.

16. A power consumption device comprising the battery of claim 15.

* * * * *